United States Patent [19]

Jonsson et al.

[11] Patent Number: 5,544,224
[45] Date of Patent: Aug. 6, 1996

[54] REESTABLISHMENT

[75] Inventors: Bjorn E. R. Jonsson, Jarfalla; Walter Ghisler, Upplands Vasby, both of Sweden

[73] Assignee: Telefonaktiebolaget LM Ericsson, Stockholm, Sweden

[21] Appl. No.: 402,391

[22] Filed: Mar. 10, 1995

Related U.S. Application Data

[63] Continuation of Ser. No. 63,976, May 20, 1993, abandoned.

[51] Int. Cl.$^6$ .................................................. H04Q 7/20
[52] U.S. Cl. .................................... 379/58; 379/63
[58] Field of Search .................. 379/58, 59, 60, 379/63, 209; 455/33.1, 33.2, 54.1, 54.2, 56.1, 34.1, 34.2

[56] References Cited

U.S. PATENT DOCUMENTS

| | | | |
|---|---|---|---|
| 3,819,872 | 6/1974 | Hamrick. | |
| 4,408,099 | 10/1983 | Ishii | 379/57 |
| 4,556,760 | 12/1985 | Goldman. | |
| 4,797,947 | 1/1989 | Labedz. | |
| 4,811,380 | 3/1989 | Spear. | |
| 4,837,800 | 6/1989 | Freeburg et al. | 379/59 |
| 5,090,051 | 2/1992 | Muppidi et al. | 379/61 |
| 5,228,026 | 7/1993 | Albrow et al. | 379/63 |
| 5,280,541 | 1/1994 | Marko et al. | 379/58 |

FOREIGN PATENT DOCUMENTS

| | | |
|---|---|---|
| 526240 | 2/1993 | European Pat. Off. . |
| 2211699 | 7/1989 | United Kingdom . |
| WO87/01897 | 3/1987 | WIPO . |
| WO93/08660 | 4/1993 | WIPO . |

OTHER PUBLICATIONS

Patent Abstracts of Japan, vol. 14, No. 22, E-874, JP 1-264321 (Oct. 20, 1989).
GSM 04.08-v. 3.11.0, pp. 137, 221, 338, 340.

*Primary Examiner*—Curtis Kuntz
*Assistant Examiner*—Michael B. Chernoff
*Attorney, Agent, or Firm*—Burns, Doane, Swecker & Mathis, L.L.P.

[57] ABSTRACT

A method and apparatus for reestablishing a call after a call has been disconnected or after the quality of the call has become bad is disclosed. A disconnected mobile station scans the signal strength of surrounding base stations and accesses the base station with the highest signal strength. The mobile station then initiates a new call back to a service node. The base station then assigns the mobile station a traffic channel and the service node reconnects the call. In addition, a method for reestablishing a call in any communication network after the call has been terminated in a normal fashion is disclosed.

39 Claims, 4 Drawing Sheets

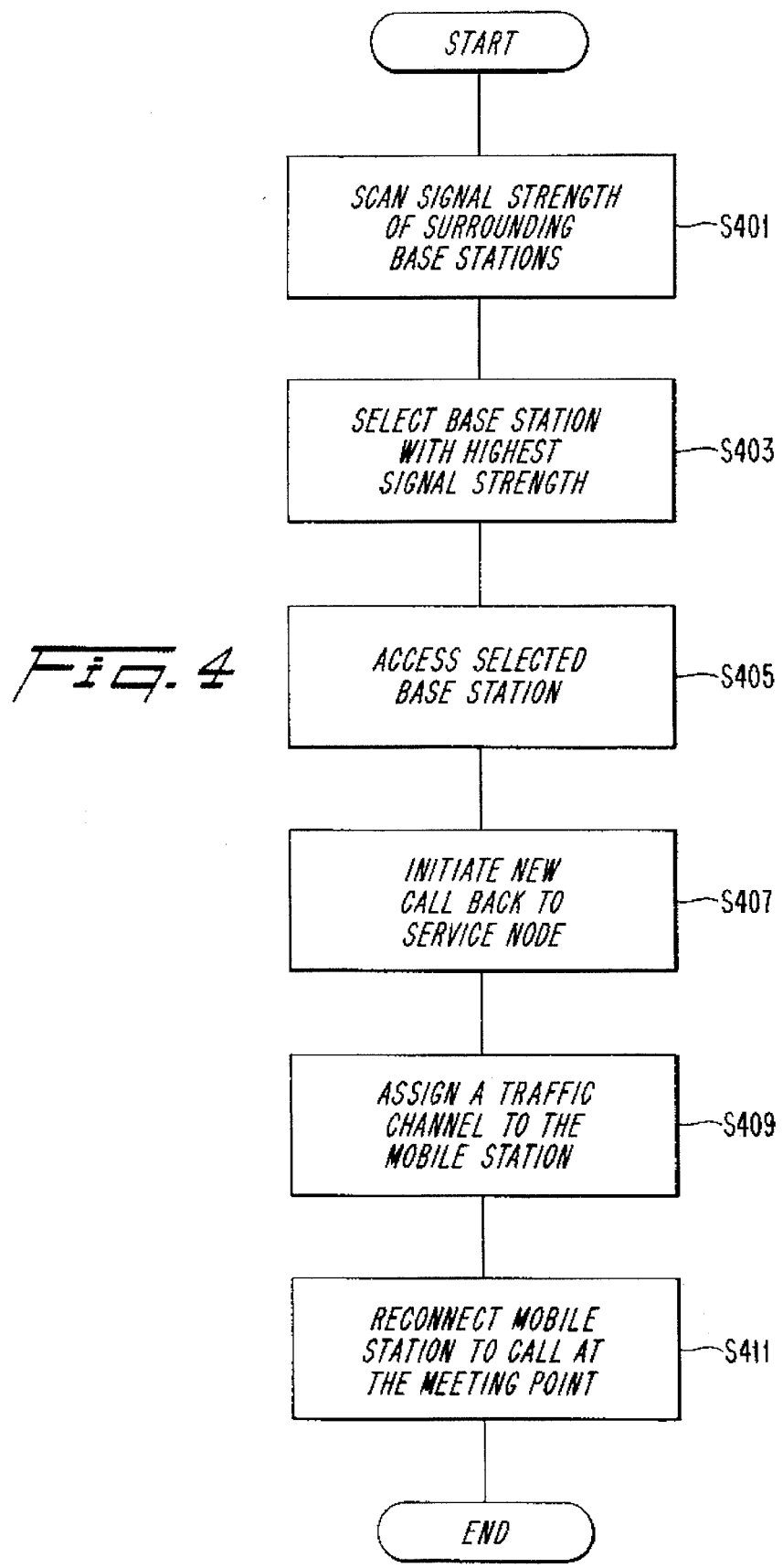

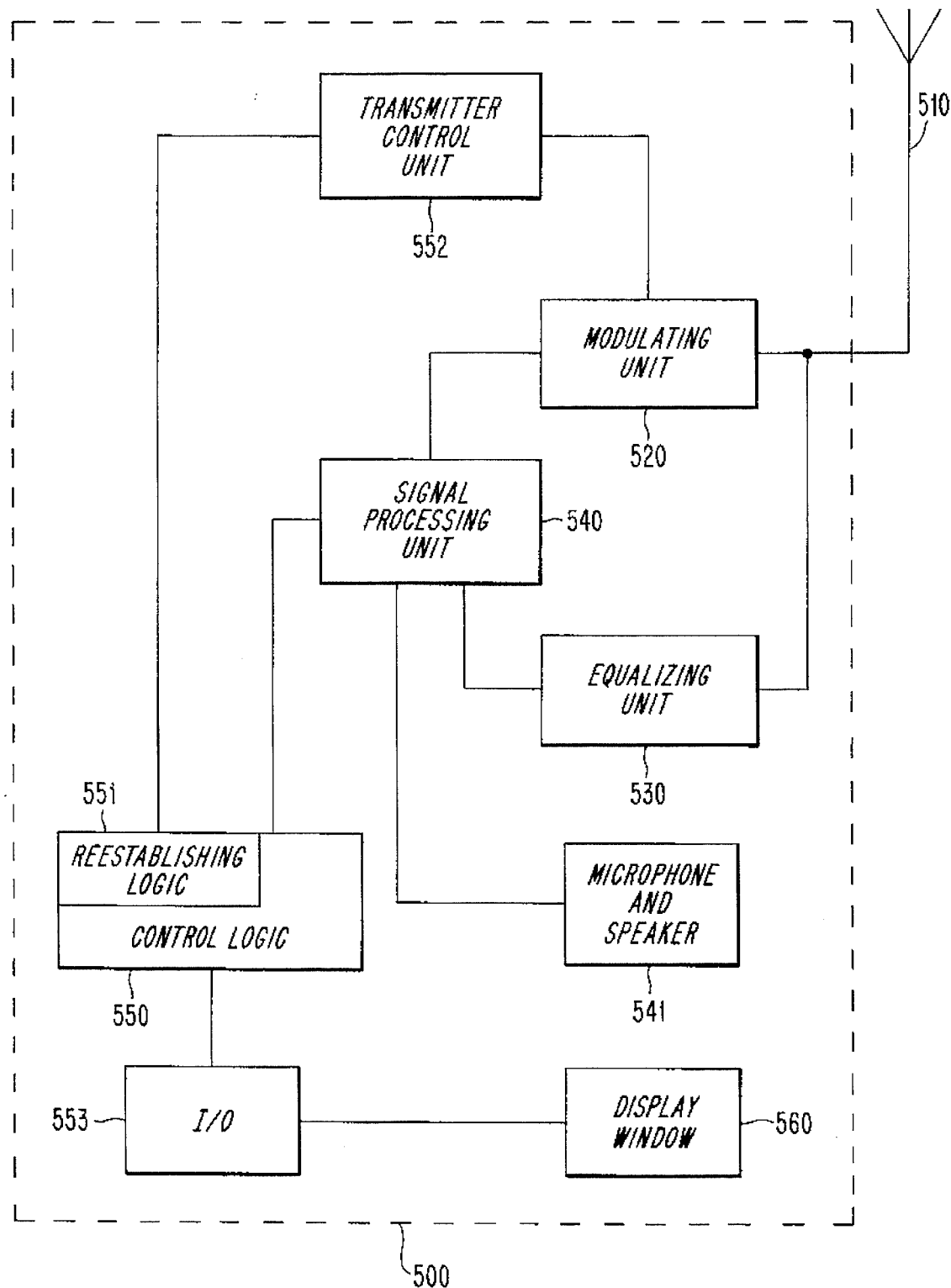

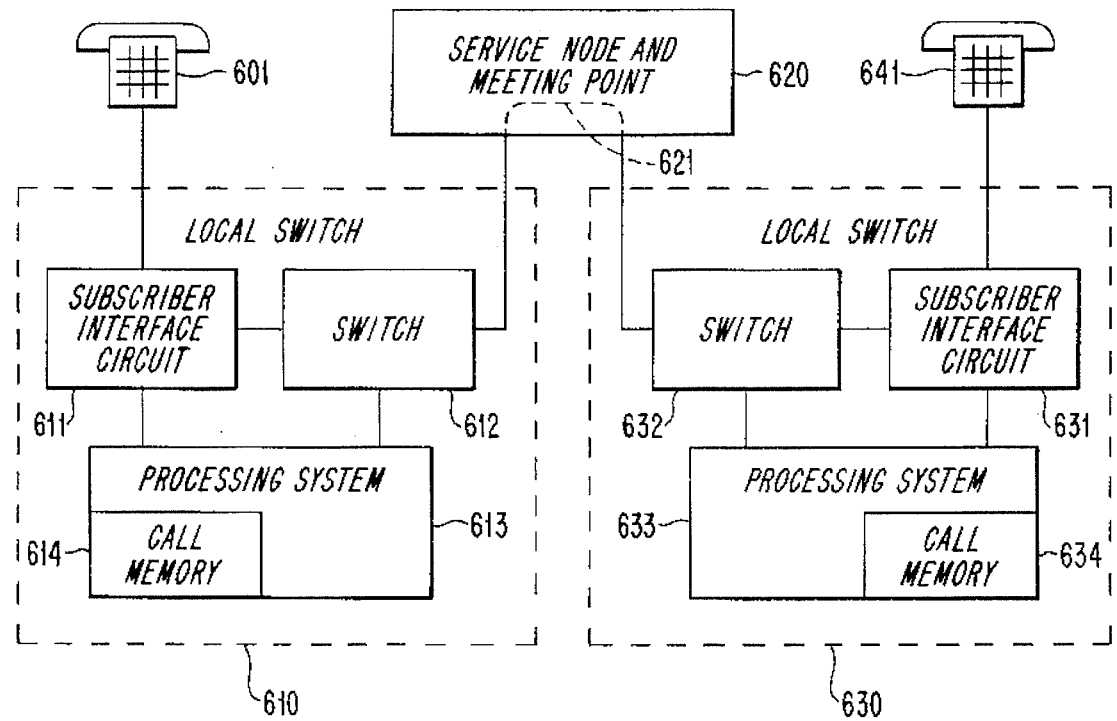

REESTABLISHMENT

This application is a continuation of application Ser. No. 08/063,976, filed May 20, 1993, now abandoned.

FIELD OF THE INVENTION

The present invention relates to any communication system and in particular to mobile radio communication systems. The present invention provides to a generic call reestablishment procedure when a connection is unwillfully lost or when the quality of the call is bad. The present invention also provides for associated apparatus.

BACKGROUND OF THE INVENTION

In cellular mobile radio systems, it is not unusual for a radio connection to be lost. The radio connection can be lost for a variety of reasons including fading when the mobile station is standing still, radio shadow from large buildings or tunnels, a handoff to a radio channel which can not support the new connection or when a base station breaks down or for some emergency must be switched off. As a result, a reestablishment routine is used in cellular systems to reconnect the lost connection.

FIG. 1 illustrates a prior art system for reestablishing a call in a cellular radio system. In this example, a standard telephone 109 communicates via a public switched telephone network PSTN (not shown) and a cellular radio communication system with a mobile radio station 104. The cellular radio communication system includes two radio base stations 101 and 102, which are both connected to the same mobile services switching center 103 by connections 107 and 108, respectively. In FIG. 1, the mobile station 104 is communicating with telephone 109 through base station 101. When the mobile station is moving toward the base station 102, it may become necessary to handoff the mobile station 104 from base station 101 to base station 102. However, if the mobile station 104 is disconnected from the base station 101 before receiving a handoff order to the new base station 102, the mobile station may initiate a reestablishment routine.

In this known reestablishment routine, the mobile station 104 scans the signal strengths of the surrounding base stations and selects the base station with the highest or next highest signal strength. The mobile station 104 then accesses the selected base station, base station 102 in this example, and requests to be reconnected. The selected base station reports the request for reconnection to the mobile services switching center 103. The mobile services switching center 103 then orders the selected base station to assign a traffic channel to the mobile station 104, and the mobile services switching center 103 then connects the mobile station to the remaining segment of the call which has been parked in the mobile services switching center 103.

In the European cellular mobile radio system (GSM), a call reestablishment procedure has been standardized which provides for call reestablishment within the same mobile services switching center. According to this standard, the mobile station accesses the best or next best base station and requests a reconnection which is provided if the accessed base station is connected to the same mobile services switching center as the original base station. However, this reestablishment routine is problematic in the sense that if the accessed base station is not connected to the same mobile services switching center, the reconnection can not be provided. For example, a subscriber with a hand held mobile station may enter or leave a building, thereby losing contact with its base station and enter an overlay network with another mobile services switching center. As a result, if the mobile station loses its connection with the base station, the call can not be reestablished. Furthermore, in non-cellular systems, an unwillful disconnection of a call associated with a wirebound terminal in a PABX or in the public switched telephone network PSTN, can only be reconnected by redialing. A faster method for reestablishing a call which does not require the user going on hook and redialing the number would therefore be welcome.

SUMMARY OF THE DISCLOSURE

It is an object of the present invention to provide a method for reestablishing a call after a call has been disconnected in a communication system, wherein a communication path is established by a service node which selects a meeting point at which the parties of a call are connected together. In the reestablishment routine disclosed in one embodiment of the present invention, after a radio mobile terminal has been disconnected, the radio mobile terminal scans the signal strength of surrounding base stations and selects the base station with the highest signal strength. The radio mobile terminal then accesses the selected base station and initiates a call back to the meeting point. The base station then assigns a traffic channel to the radio mobile terminal and the network reconnects the radio mobile terminal to the meeting point, thereby reestablishing the call.

Another embodiment of the present invention provides the option of reestablishing a call within a certain period of time after a call is willfully or unwillfully disconnected involving a wirebound terminal. The reconnection can be requested by pressing a predetermined key or keys on the keyset of the wirebound terminal after which the wirebound network reestablishes the involved half of the connection to the meeting point using a meeting point identity stored in either the terminal or in the system.

Another embodiment of the present invention provides handoff in personal communication systems (PCS) which traditionally do not provide for handoffs, by using reestablishment to a meeting point in a similar way as described above.

BRIEF DESCRIPTION OF THE DRAWINGS

The present invention will now be described in more detail with reference to the preferred embodiments of the invention, given only by way of example, and illustrated in the accompanying drawings, in which:

FIG. 4 illustrates a flow chart describing the steps of the reestablishment routine disclosed in the present invention;

FIG. 5 illustrates a mobile radio station according to one embodiment of the present invention;

FIG. 6 illustrates another embodiment of the present invention; and

FIG. 7 illustrates a flow chart describing the steps of one embodiment of the present invention.

DETAILED DESCRIPTION OF THE PREFERRED EMBODIMENTS

While the following description is in the context of cellular communication systems involving portable or mobile radio telephones and/or personal communication networks, it will be understood by those skilled in the art that the present invention may be applied to other communications applications.

In the present invention, the parties of a call are connected to a meeting point, according to the meeting principle disclosed in U.S. patent application Ser. No. 08/018,223, entitled "Method of Organizing Communication" and U.S. patent application Ser. No. 08/018,268, entitled "Method of Establishing Cooperation with a Functionality" which are commonly assigned and are incorporated herein by reference. Briefly, according to the meeting principle, a call is set up as two different connections to a meeting point in the network. As a result, the parties of a call are connected to each other at the meeting point. A meeting organizer or service node selects the meeting point and transmits interaction numbers to each party of the call, wherein the interaction number identifies the meeting point. The interaction numbers are stored in the respective terminal or in the respective switch nearest to the subscriber and used for call reestablishment, if required, by calling the meeting point again. In this embodiment of the present invention, the interaction numbers are maintained active for the whole duration of the call and are not cancelled after the call setup since they must be used during call reestablishment. In addition, the interaction numbers remain active after the termination of the call for a predetermined period of time. The predetermined period of time can vary depending on the situation, for example, the terminal being the calling or called terminal, the disconnection being caused by going on-hook or not, etc.

Figure 1:
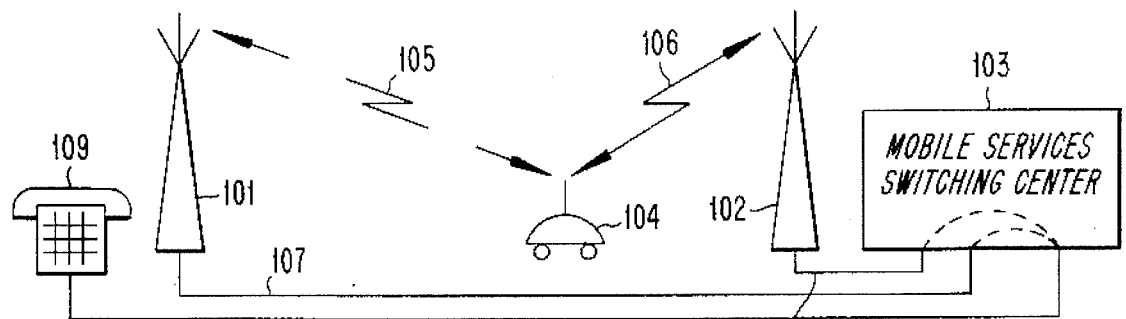
FIG. 1 illustrates a prior art method for reestablishing a call.
Figure 2:
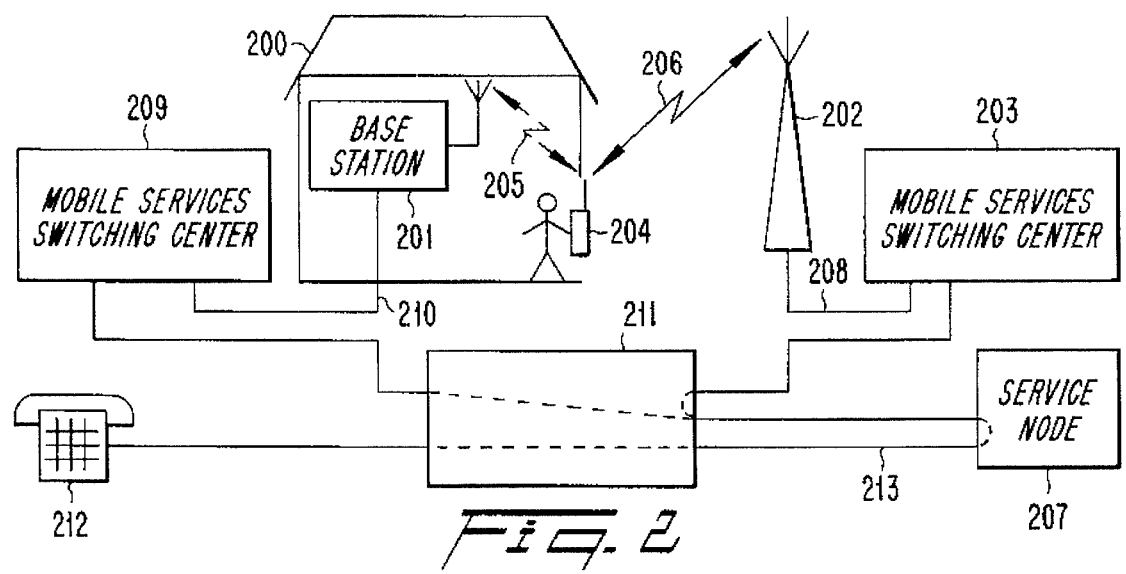
FIG. 2 illustrates one embodiment of the present invention.

FIG. 2 illustrates one embodiment of the present invention. In this embodiment, a standard telephone 212 communicates via a public switched telephone network PSTN and a cellular radio communication system with a mobile radio station 204 through a service node 207 at a meeting point. The cellular radio communication system includes two mobile services switching centers 209 and 203, respectively, and two base stations 201 and 202. In this embodiment, while the first base station 201 is connected to the mobile services switching center 209 and the second base station is connected to the mobile services switching center 203, the present invention is not limited thereto and the two base stations could also be connected to the same mobile services switching center.

In FIG. 2, the mobile station 204 is communicating with telephone 212 through base station 201. However, in this example, the mobile station is moving toward base station 202 and it may become necessary to handoff the mobile station 204 from base station 201 to base station 202. However, if the mobile station 204 is disconnected from the base station 201 before receiving a handoff order to the new base station 202, the mobile station initiates the following reestablishment routine which is illustrated in FIG. 4. In this reestablishment routine, the mobile station 204 scans the signal strength of surrounding base stations in step 401 and selects the base station with the highest signal strength in step 403. The mobile station then accesses the selected base station in step 405 and initiates a new call back to the service node 207 (which in this case is assumed to be identical to the meeting point) using in step 407 an interaction number stored at call setup in the mobile station 204. The selected base station then assigns a traffic channel to the mobile station 204 according to a known call setup procedure in step 409 and the service node 207 reconnects the mobile station 204 to the remaining segment of the call at the meeting point in step 411.

Figure 3:
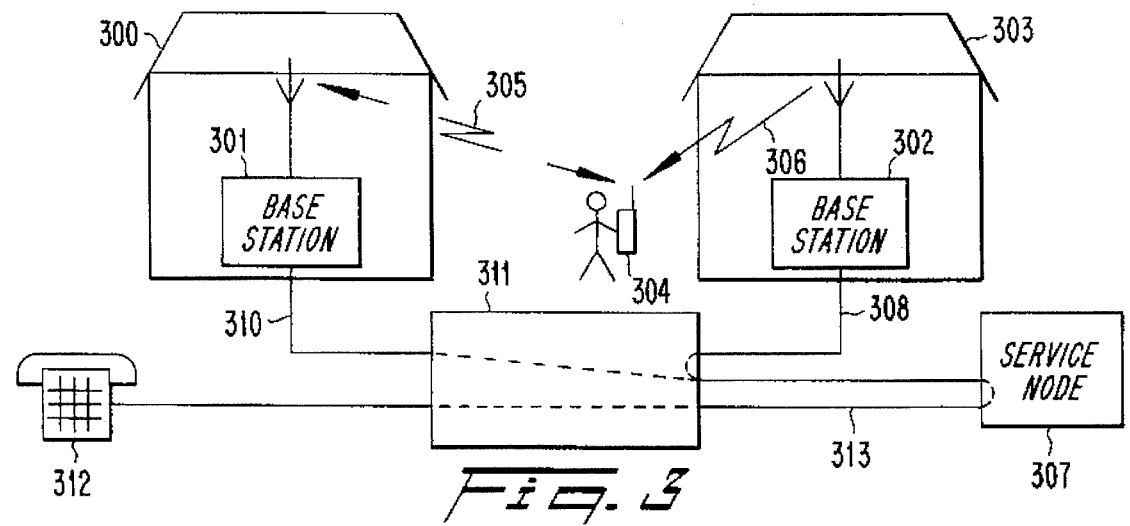
FIG. 3 illustrates another embodiment of the present invention.

FIG. 3 illustrates another embodiment of the present invention for radio in the local loop (RLL) or telepoint systems. Telepoint and RLL systems are characterized by the fact that they do not include mobile services switching centers and that the base stations are connected directly to the public switched telephone network PSTN. In these systems, handoffs are not provided since the system does not include mobile services switching centers. According to this embodiment of the present invention, call reestablishment may be used whenever a call has been lost or if the call has poor quality, thereby providing a substitute for the lacking handoff function.

In FIG. 3, the cellular radio system includes two base stations 301 and 302 which are connected to a service node 307 via the public switched telephone network. When a mobile station 304 is accidentally disconnected or when the user of the mobile station considers the quality of the call to be unsatisfactory, the mobile station 304 scans surrounding base stations and selects the base station with the highest signal strength. The mobile station 304 then accesses the selected base station and initiates a call back to the service node 307 using an interaction number stored in the mobile station 304. The selected base station then assigns a traffic channel to the mobile station 304 according to a known call setup procedure and the service node 307 reconnects the mobile station 304 to the remaining segment of the call which is parked in service node 307.

In one embodiment of the present invention, reestablishment may be initiated automatically when the quality of the connection has been below a predetermined level for a predetermined period of time. The need for handoff may be due to the subscriber moving or to a disturbance on the radio channel which is used for the connection. In addition, the reestablishment routine may be manually initiated by the user of the mobile station when the user considers the quality of the connection to be unacceptable by depressing at least one key on a keyset on the radio mobile terminal. The quality of the connection may be measured as the bit error rate BER and can be measured at either the mobile station or the base station. Furthermore, initiating reestablishment may be performed by going on hook and off hook and then setting up a new call to the service node 207 by entering as an interaction number the service node's secret telephone number which may have been prestored in the short number memory of the terminal.

Going on-hook and then off-hook again within a certain period of time also introduces a new "repenting function" in the network wherein if a subscriber repents after going on-hook, he may go off-hook again within the predetermined period of time and reestablish the call by pressing a predetermined key on the keyset, provided the other participant is still off-hook. It should be understood that the interaction number may be specific for each call, or if an "electronic secretary" is used as a meeting point, a fixed secret number. This is explained in the U.S. patent applications which have been included herein by reference.

FIG. 5 illustrates a mobile radio station according to one embodiment of the present invention. The mobile station 500 has an antenna 510. A transmitter 520 is connected to the antenna 510 and is controlled by a transmitter control unit 552. The transmitter is also connected to a signal processing unit 540. The receiver 530 is also connected to the antenna and is used in time multiplexing together with the transmitter. The receiver 530 is also connected to the signal processing unit 540. The radio equipment for modulating and equalizing purposes is included in blocks 520 and 530. The signal processing unit 540 includes equipment for channel coding, channel decoding, and signal processing of incoming and outgoing speech. The signal processing unit 540 is also connected to a microphone and speaker 541 and to control logic 550. In turn, the control logic 550 is connected to the transmitter control unit 552 and to IO 553 which adapts the signals from the keyboard and to a display window 560.

The invention is implemented in the form of a program sequence in the control logic 550 and has been designated 551, "reestablishing logic". The control logic 550 monitors the connection according to methods well known in the art and when it detects that the connection has been lost the control logic initiates a call to a telephone number stored in the reestablishing logic 551. This telephone number may be the predetermined "secret" number of the service node or electronic secretary which may have been entered into block 551 via the keyset of the mobile radio terminal or in some other manner. The telephone number may have alternatively been entered into block 551 from the network when setting up the call, e.g., by a message on the FACCH giving the IA number of the meeting point relating to the established call. In addition to the automatic reestablishment described above, a call may be reestablished manually by the subscriber pressing a predetermined sequence of keys causing the reestablishment to be activated in spite of the fact that supervising logic of block 550 does not consider the connection to be broken. As a result, a subscriber can activate the reestablishment routine when the subscriber believes that the present connection has unsatisfactory quality.

FIGS. 6 and 7 illustrate one embodiment of the present invention wherein the reestablishment routine can be manually initiated after a normal termination of a wirebound terminal. In FIG. 6, two wirebound telephone terminals 601 and 641 are currently communicating with each other via their respective local switches 610 and 630 and via a service node and meeting point 620. At the meeting point, the two halves of the call, identified by their respective interaction numbers, are connected together as indicated by the link 621. The local switches 610 and 630 have subscriber interface circuits 611 and 631, switches 612 and 632, and processing systems 613 and 633 with associated call memories 614 and 634, wherein the respective interaction numbers are stored during the call and for a predetermined period of time after the call has been terminated.

FIG. 7 is a flow chart illustrating the events that occur when the call in progress experiences an unwanted disconnection in step 701, i.e., if a child depresses the on-hook contact while the user is speaking on the phone. After the unwanted disconnection, the user depresses a predefined key or sequence of keys or uses the on-hook contact followed by some keys, for example, "on-hook contact, #, 7", which indicates a request for reestablishment of the call. The associated local switch reacts to this request in step 703 by looking up in the memory 614 for terminal 601 or in the memory 634 for terminal 641 whether the subscriber in question has an active call record with an interaction number. If the answer is yes, the call to the meeting point 620 is reestablished in step 704 by the respective local switch 610 or 630. If the answer is no, an acoustical signal is given to the subscriber in step 705 to indicate that the connection can not be reestablished. It is also possible for the subscriber who did not cause the interruption to request reestablishment. This leads to the same sequence of events describe above, since the local exchange can not distinguish which half of the call needs to be reconnected.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for reestablishing a call after the call has been disconnected involving a terminal in a communication system, wherein a first radio communication path has been established between the terminal and a first radio station before the disconnection of the call and a second radio communication path is established between the terminal and the second radio station after the disconnection of the call, and wherein a wired communication path is established from the second radio station to a meeting point selected by a service node common to a plurality of such communication paths, at which meeting point the parties of the call are connected together, said method comprising the steps of:

initiating a new call back across said second radio communication path to said meeting point, wherein said terminal initiates said call back to said service node using an interaction number which is different from a called party's number and is entered and stored prior to call disconnection in said terminal or in equipment permanently connected to said terminal; and said meeting point, when receiving said interaction number, reconnecting the terminal to the opposite party.

2. A method for reestablishing a call after the call has been disconnected according to claim 1, wherein said interaction number is sent to said terminal during call setup.

3. A method for reestablishing a call after the call has been disconnected according to claim 1, wherein said interaction number is inserted via a key set on said terminal.

4. A method for reestablishing a call after the call has been disconnected according to claim 1, wherein said new call is initiated automatically after the call has been disconnected.

5. A method for reestablishing a call after the call has been disconnected according to claim 1, wherein said new call is initiated after the call has been disconnected and a subscriber depresses at least one key on a keyset on said terminal.

6. A method for reestablishing a call after the call has been disconnected according to claim 1, wherein said terminal is a mobile radio terminal.

7. A method for reestablishing a call after the call has been disconnected according to claim 1, wherein said terminal is a wirebound terminal.

8. An apparatus for reestablishing a call from a terminal after the call has been disconnected in a communication system, wherein a first radio communication path has been established between the terminal and a first radio station before the disconnection of the call and a second radio communication path is established between the terminal and the second radio station after the disconnection of the call and wherein a wired communication path is established from the second radio station to a meeting point selected by a service node common to a plurality of such communication paths, at which meeting point the parties of a call are connected together, comprising:

means for initiating a new call back across said second radio communication path to said meeting point, wherein the terminal initiates the call back to said service node using an interaction number which is different from a called party's number and is entered and stored prior to call disconnection in said terminal or in equipment permanently connected to said terminal; and means for reconnecting the terminal to the opposite party.

9. An apparatus for reestablishing a call after the call has been disconnected according to claim 8, wherein said interaction number is sent to said terminal during call setup.

10. An apparatus for reestablishing a call after the call has been disconnected according to claim 8, wherein said interaction number is inserted via a key set on said terminal.

11. An apparatus for reestablishing a call after the call has been disconnected according to claim 8, wherein said new call is initiated automatically after the call has been disconnected.

12. An apparatus for reestablishing a call after the call has been disconnected according to claim 8, wherein said new call is initiated manually after the call has been disconnected and a subscriber depresses at least one key on the keyset on the terminal.

13. An apparatus for reestablishing a call after the call has been disconnected according to claim 8, wherein said terminal is a mobile radio terminal.

14. An apparatus for reestablishing a call after the call has been disconnected according to claim 8, wherein said terminal is a wirebound terminal.

15. A method for reestablishing a call which has a quality level considered below an acceptable level by a subscriber participating in the call, said call involving a terminal in a communication system, wherein a first radio communication path has been established between the terminal and a first radio station before the disconnection of the call and a second radio communication path is established between the terminal and the second radio station after the disconnection of the call and wherein a wired communication path is established from the second radio station to a meeting point selected by a service node common to a plurality of such communication paths, at which meeting point the parties of the call are connected together, said method comprising the steps of:

initiating a new call back across said second radio communication path to said meeting point, wherein said terminal initiates said call back to said service node using an interaction number which is different from a called party's number and is entered and stored prior to call disconnection in said terminal or in equipment permanently connected to said terminal; and said meeting point, when receiving said interaction number, reconnecting the terminal to the opposite party.

16. A method for reestablishing a call according to claim 15, wherein said interaction number is sent to said terminal during call setup.

17. A method for reestablishing a call according to claim 15, wherein said interaction number is inserted via a key set on said terminal.

18. A method for reestablishing a call according to claim 15, wherein said new call is initiated after the quality of the call has fallen below a predetermined level for a predetermined period of time and a subscriber depresses at least one key on a keyset on said terminal.

19. A method for reestablishing a call according to claim 15, wherein said terminal is a mobile radio terminal.

20. A method for reestablishing a call according to claim 15, wherein said terminal is a wirebound terminal.

21. An apparatus for reestablishing a call which has a quality level considered below an acceptable level by a subscriber participating in the call, said call involving a terminal in a communication system, wherein a first radio communication path has been established between the terminal and a first radio station before the disconnection of the call and a second radio communication path is established between the terminal and the second radio station after the disconnection of the call and wherein a wired communication path is established from the second radio station to a meeting point selected by a service node common to a plurality of such communication paths, at which meeting point the parties of a call are connected together, comprising:

means for initiating a new call back across said second radio communication path to said meeting point, wherein the terminal initiates the call back to said service node using an interaction number which is different from a called party's number and is entered and stored prior to call disconnection in said terminal or in equipment permanently connected to said terminal; and means for reconnecting the terminal to the opposite party.

22. An apparatus for reestablishing a call according to claim 21, wherein said interaction number is sent to said terminal during call setup.

23. An apparatus for reestablishing a call according to claim 21, wherein said interaction number is inserted via a key set on said terminal.

24. An apparatus for reestablishing a call according to claim 21, wherein said new call is initiated manually after the quality of the call has fallen below a predetermined level for the predetermined period of time and a subscriber depresses at least one key on the keyboard on the terminal.

25. An apparatus for reestablishing a call according to claim 21, wherein said terminal is a mobile radio terminal.

26. An apparatus for reestablishing a call according to claim 21, wherein said terminal is a wirebound terminal.

27. A method for reestablishing a call after a normal termination involving a terminal in a communication system wherein, wherein a first radio communication path has been established between the terminal and a first radio station before the disconnection of the call and a second radio communication path is established between the terminal and the second radio station after the disconnection of the call and a wired communication path is established from the second radio station to a meeting point selected by a service node common to a plurality of such communication paths, at which meeting point the parties of the call are connected together, said method comprising the steps of:

depressing a predetermined key or sequence of keys on a keyset on said terminal after the call has been terminated;

determining whether the terminal has an active call record with an interaction number, said interaction number being different from a called party's number; and said meeting point, when receiving said interaction number reconnecting said terminal to the opposite party.

28. A method for reestablishing a call after a normal termination according to claim 27, wherein said call record remains active after the termination for a predetermined period of time.

29. A method for reestablishing a call after a normal termination according to claim 27, wherein either party can initiate the reestablishment method.

30. A method for reestablishing a call after a normal termination according to claim 27, wherein said terminal generates an acoustic signal when the call can not be reestablished.

31. A method for reestablishing a call after a normal termination according to claim 27, wherein said terminal is a mobile radio terminal.

32. A method for reestablishing a call after a normal termination according to claim 27, wherein said terminal is a wirebound terminal.

33. An apparatus for reestablishing a call after a normal termination involving a terminal in a communication system, wherein a first radio communication path has been established between the terminal and a first radio station before the disconnection of the call and a second radio communication path is established between the terminal and the second radio station after the disconnection of the call and wherein a wired communication path is established from the second radio station to a meeting point selected by a service node common to a plurality of communication paths, at which meeting point the parties of the call are connected together, comprising:

means on said terminal for initiating the reestablishment procedure after the call has been terminated;

means for determining whether the terminal has an active call record with an interaction number, said interaction number being different from a called party's number; and means for reconnecting paid terminal to the opposite party.

34. An apparatus for reestablishing a call after a normal termination according to claim 33, wherein said call record remains active after the termination for a predetermined period of time.

35. An apparatus for reestablishing a call after a normal termination according to claim 33, wherein either party can initiate the reestablishment procedure.

36. An apparatus for reestablishing a call after a normal termination according to claim 33, wherein said terminal generates an acoustical signal when said call can not be reconnected.

37. An apparatus for reestablishing a call after a normal termination according to claim 33, wherein the reestablishment procedure is initiated by depressing at least one predetermined key on a keyset on said terminal.

38. An apparatus for reestablishing a call after a normal termination according to claim 33, wherein said terminal is a mobile radio terminal.

39. An apparatus for reestablishing a call after a normal termination according to claim 33, wherein said terminal is a wirebound terminal.

* * * * *